Patented June 26, 1923.

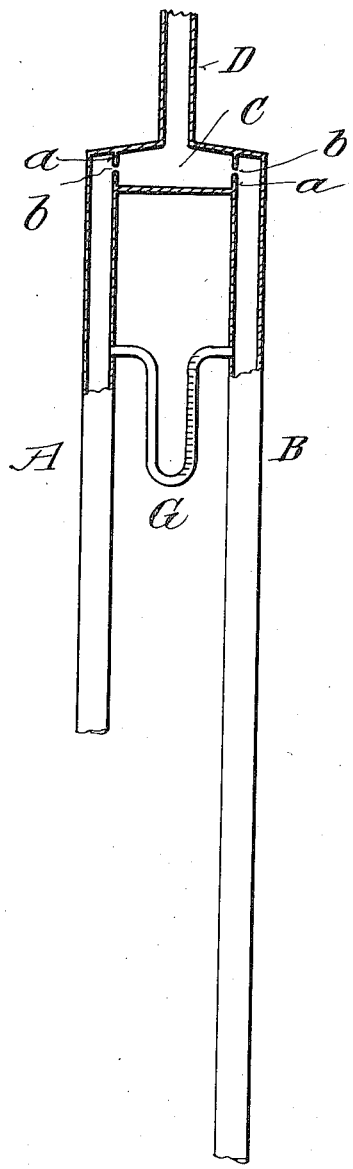

1,460,134

UNITED STATES PATENT OFFICE.

JACOB M. JOHLIN, OF SYRACUSE, NEW YORK, ASSIGNOR TO SEMET-SOLVAY COMPANY, OF SOLVAY, NEW YORK, A CORPORATION OF NEW YORK.

DEVICE FOR DETERMINING THE SPECIFIC GRAVITY OF LIQUIDS.

Application filed October 23, 1920. Serial No. 419,146.

*To all whom it may concern:*

Be it known that I, JACOB M. JOHLIN, a citizen of the United States, residing at Syracuse, in the county of Onondaga and State of New York, have invented a new and Improved Device for Determining the Specific Gravity of Liquids, of which the following is a specification.

The object of my improvements is to provide a simple and efficient means for measuring the specific gravity of a liquid.

The invention will be best understood by reference to the accompanying drawing which shows a sectional view of an embodiment thereof.

Referring to the drawing, A, B, represent two tubes of unequal length open to atmosphere at one end and at the other connected with a head, C, adapted to be connected by a pipe, D, with a source of gas pressure, not shown in the drawing.

In the head, C, are diaphragms $a$, $a$, provided with constricted openings, $b$, $b$, through which gas under pressure may pass into the tubes, A, B. Between the upper portions of the tubes A, B, is connected a pressure gauge or manometer, G. In using the device the open ends of the tubes, A, B, are placed below the surface of the liquid the specific gravity of which is to be ascertained and air or other gas is forced through the tubes until it escapes from the lower open ends of both. Evidently there will be a greater pressure in the longer tube, B, than in the shorter tube, A, and the difference in pressure will vary with variations in the specific gravity of the liquid.

The pressure gauge, G, is provided with a scale reading by applying the device to a liquid or liquids of known specific gravity at a given temperature and thus the ready determination of the specific gravity of any liquid is made possible.

It is not essential that the tubes shall be connected with the same source of gas supply and the exact manner of connection between the tubes, A, B, and the gas supply is not essential. It is, however, necessary where there is a common gas supply, that the tubes shall be supplied with gas through constricted openings so as to prevent an excessive proportion of the quantity of gas supplied from escaping through the shorter tube.

What I claim as new and desire to secure by Letters Patent is:—

A device for determining the specific gravity of liquids consisting of two tubes of unequal length open at one end and adapted to receive at their other ends gas under pressure through constricted openings and a pressure gauge connected between said tubes.

In testimony whereof I affix my signature, this 18th day of October, 1920.

JACOB M. JOHLIN.